(No Model.) 2 Sheets—Sheet 1.
J. GILBERT.
THRUST BEARING.
No. 564,609. Patented July 28, 1896.
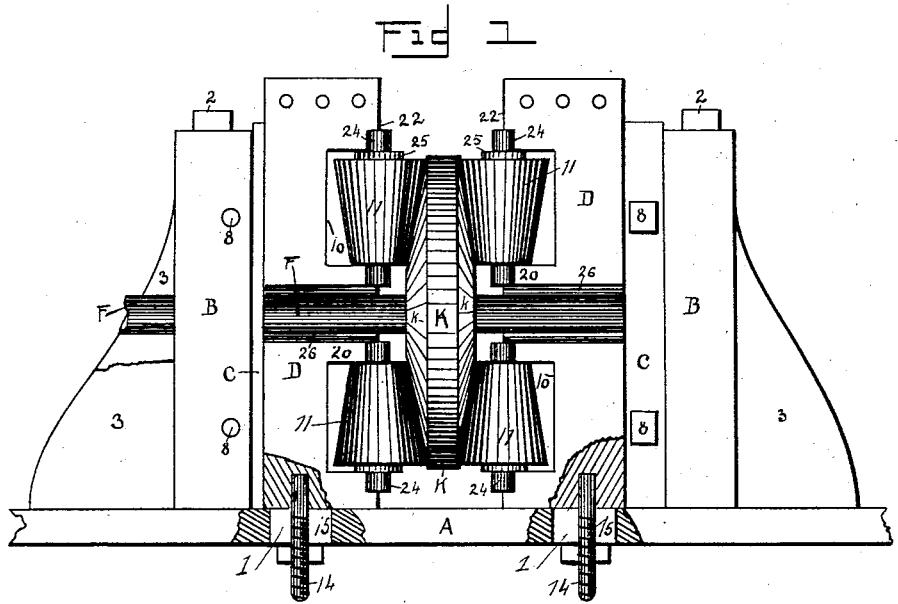
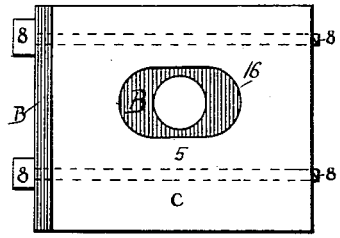
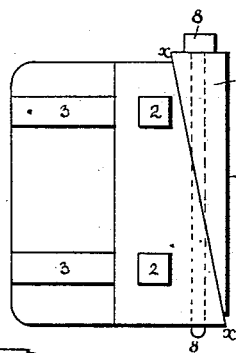
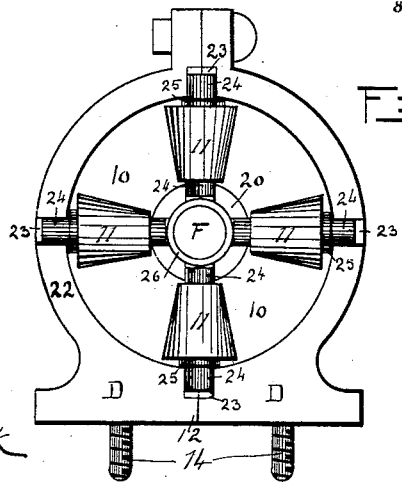
WITNESSES:
O. F. Douron
H. W. Pennock
INVENTOR
James Gilbert
BY
C. W. Sues.
ATTORNEY.

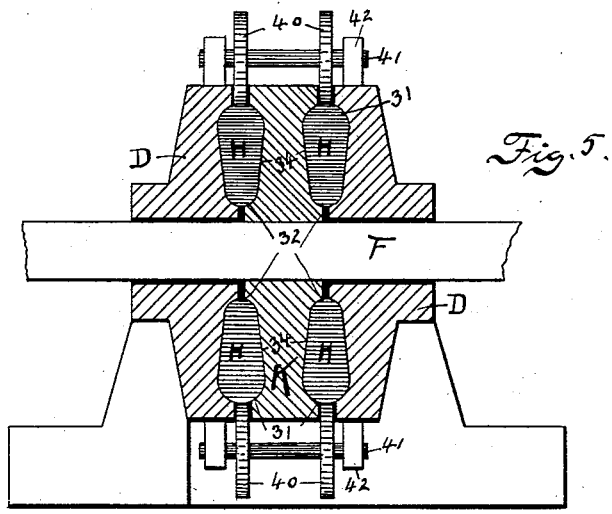

UNITED STATES PATENT OFFICE.

JAMES GILBERT, OF OMAHA, NEBRASKA.

THRUST-BEARING.

SPECIFICATION forming part of Letters Patent No. 564,609, dated July 28, 1896.

Application filed September 12, 1893. Serial No. 485,353. (No model.)

*To all whom it may concern:*

Be it known that I, JAMES GILBERT, of Omaha, in the county of Douglas and State of Nebraska, have invented certain useful Improvements in Thrust-Bearings; and I do hereby declare that the following is a full, clear, and exact description of the invention, such as will enable others skilled in the art to which it appertains to make and use the same, reference being had to the accompanying drawings, which form a part of this specification.

This invention has relation to a new and novel thrust-bearing, more particularly adapted to be used in combination with a propeller-shaft.

The aim and object of my invention are to provide a thrust-bearing for propeller-shafts in which the friction shall be reduced to a minimum and in which the parts shall be so arranged that they will be easy of access.

In the accompanying drawings, Figure 1 shows a side view of my improved thrust-bearing with parts broken away. Fig. 2 shows an end view of one of the bearings.
Fig. 3 shows a top view of one of the bearings, while Fig. 4 shows an end view of one of the bearing-blocks, showing the position of the rollers. Fig. 5 is a modification.

A represents a base-plate (provided with the openings 1 1) of any suitable length and material, to which are secured the two similar bearings B B, identical in construction, and provided with the retaining-nuts 2 and the strengthening-webs 3, as shown. These bearings are secured a suitable distance apart, the faces of each bearing lying in a plane at right angles to a plane passing through the shaft-openings, the bearing-faces, however, extending at an angle or obliquely, as is shown in Fig. 3, where the line *x x* represents the edge of one of the bearing-faces. Working against these faces are the wedge-plates C, one at each end of the bearing. The wedge-plates appear as a right-angled triangle, the angular face being adapted to lie against the angular face of the bearing, so that the overlapping wedge-plate and the bearing against which it rests form, in cross-section, a rectangular quadrilateral, one side of which can be shifted to increase the area in one direction, as shown in Fig. 3. When these wedge-plates are placed against the inner faces of the bearings B B, they present the plane surfaces 5, against which the journal-casings D at each end are adapted to work, as shown more clearly in Fig. 1.

Each of the bearings B is provided with a suitable number of screws 8, which pass centrally through their faces and are continued through the wedge-plates C, as will be understood by referring to Fig. 2, where the retaining-bolts are shown. These bolts 8 extend through the bearings B and the wedge-plates C, and so movably secure them.

The journal-casings D are preferably disk-shaped or round and are each provided with an interior groove 10, forming two projecting flanges 21 and 22, within which series of cone-pulleys 11 are adapted to work. These casings D are provided with a suitable base 12, and are secured to the base-plate A by means of the bolts 14, which pass into these bases and through the base-plate and permit adjustment of these casings in a longitudinal direction, the bolts 14 sliding within the openings 15, as illustrated. The wedge-plates C are each provided, in front, with an elongated opening 16, as shown in Fig. 2, through which the propeller-shaft F is adapted to pass.

The casings D, which are preferably in two parts, are secured above by means of suitable bolts, and are strengthened below by means of bolts 14, and also by means of the bolts 14. These casings are preferably in two parts, so that they can be readily placed around a shaft or taken therefrom. These casings have a number of semicircular bearings 23, which are positioned within the flanges 20 and 22 of the casings, and so are adapted to give seating to the projecting hubs 24 of the conical rollers 11, as shown in both Figs. 1 and 4. Fig. 2 clearly shows the position of the adjustable wedge-plate C, which is adjusted by the screws, while Fig. 3 shows a top view thereof. The rollers 11 are loosely held within their bearings and are each preferably provided with a suitable collar 25. The journals 24 may be cast integral with the roll proper or be a separate metallic rod or bar, which is forced through the rollers 11. These rollers are in the form of a truncated cone, with the narrow end toward the central opening 26, through which the shaft is made to pass. In my drawings I have shown a system of four of these conical rollers, though I do not wish to confine myself to any specific number.

The propeller-shaft proper is provided at a suitable point with an outwardly-projecting flange or collar K, decreasing in thickness toward the outer edge, which collar is either welded directly to the shaft or secured thereto by means of keys. This collar K has two angular wearing-faces *k*, against which the conical bearings 11 11 are adapted to work. The instrumentalities are arranged as follows:

The shaft, which may be provided with any suitable number of these collars K, is first provided with two of the bearings B, which are secured to the shaft in the usual manner and then fixed to the base-plate A. The wedge-plates C are next secured to the bearings B by means of the bolts 8, when the journal-casings D D are secured one upon each side of the shaft of the collar K, as shown in Fig. 1, the rolls being made to snugly work up against the angular faces of the collar K, adjustment being given the plates C by means of the bolts 8. The bolts 14 are next inserted, so as to secure the casings to the base-plate. The casings D are supposed to snugly fit against their respective bearings B after they have been positioned in front of the collar K. The proper tension and adjustment are then imparted to these casings and to their respective rolls 11, which have been previously inserted, by means of the transverse bolts 8, which may be either tightened or loosened to force the wedge-plates either inward or outward, so that any desired tension may be imparted to the rolls and so that any movement due to the wearing of either the collar K or the rolls can be nicely taken up.

It will be noticed that my device comprises, essentially, the two bearings B B, the wedge-plates C, the rolls 11 and casings D, and the adjusting-bolts 8, resting half in the wedge-plates and half in the casing D. If more than one of the collars K should be attached to the shaft, it is, of course, understood that the bearings B could be provided with two angular faces, so that one block would give a purchase to two of the sliding wedge-plates. In case of a fracture of one of the rolls or one of the bearings the wedge-plates can be drawn out and the device loosened and removed from the collar K without great loss of time or inconvenience, and even when the shaft is revolving, the parts all being readily accessible.

In Fig. 5 I have shown a modification wherein I have eliminated the cone-shaped rollers 11, as shown in Figs. 1 and 2, and substituted in their place a series of tapered rollers having both ends terminating in semisphere. These tapered rollers are permitted to freely work between the collar K and the casing, as in the previous case. In revolving, these rollers will, of course, gradually wear toward the peripheral flange of the collar, and so I place, at one or more points, a small auxiliary journal 40, which is adapted to work between the casing and the collar, and so, whenever these spherically-ended rollers encounter this journal, they are forced downward, the casings D being secured by means of two wedge-plates, as in the previous instance.

Now, having thus described my said invention, what I claim as new, and desire to secure by United States Letters Patent, is—

1. In a thrust-bearing, the combination, with a shaft and a collar on said shaft, of two journal-casings adjustably secured one upon each side of said collar and two series of rollers adapted to work against said shaft-collar; two bearings adapted to give support to said shaft, in combination with two wedge-plates, one at each end of said journal-casings; said wedge-plates being adjustably secured to and working upon said bearings and against said journal-casings, all substantially as and for the purpose set forth.

2. The combination with a propeller-shaft and a collar, in the shape of a double truncated cone having a common base, of two journal-casings positioned one upon each side of said collar, said casings each being provided with a hub and a peripheral flange; registering journal-bearings within said hub and peripheral flange; a series of cone-rollers provided with projecting journals working within said bearings; said cone-rollers working against said propeller-shaft collar; bearings adapted to support said propeller-shaft, and adjustable wedge-plates, said wedge-plates being held between said shaft-bearings and journal-casings, all substantially as and for the purpose set forth.

3. In a thrust-bearing, the combination, with the shaft, F, the collar, K, having two bearing-places, *k*, *k*, and the journal-casings, D, each provided with a hub and peripheral flange having registering journal-bearings, of the journaled rollers, 11, working within said hubs and peripheral flanges and against the faces of the collar, K, the bearings, B, provided with the oblique faces, and the wedge-plates, C, C, secured to said bearings, B, by means of the screws, 8, all substantially as and for the purpose set forth.

In testimony whereof I affix my signature in presence of two witnesses.

JAMES GILBERT.

Witnesses:
R. H. YEOMAN,
G. W. SUES.